United States Patent Office 3,454,657
Patented July 8, 1969

3,454,657
CATALYTIC SYNTHESIS OF ORGANIC
HALOGEN COMPOUNDS
Dalton L. Decker and Carl Moore, Midland, Mich., and
William F. Tousignant, Elm Grove, Wis., assignors to
The Dow Chemical Company, Midland, Mich., a corporation of Delaware
No Drawing. Continuation-in-part of application Ser. No.
472,718, July 16, 1965, which is a continuation-in-part
of application Ser. No. 255,088, Jan. 30, 1963. This application Aug. 24, 1967, Ser. No. 662,867
Int. Cl. C07c 17/28
U.S. Cl. 260—651                 7 Claims

ABSTRACT OF THE DISCLOSURE

Method for forming a chemical adduct of an ethylenically unsaturated compound with a halogenated organic compound having on a single carbon atom thereof at least two halogen atoms at least one of which is chlorine, bromine or iodine, characterized by employing a catalyst of which the essential members are copper and an amine selected from piperidine, substituted piperidines, cyclohexylamines, and secondary amines on which the hydrocarbyl substituents are allyl, benzyl or lower alkyl radicals.

CROSS-REFERENCES TO RELATED APPLICATIONS

This is a continuation-in-part of our copending application Ser. No. 472,718, filed July 16, 1965, and now abandoned, which was in turn a continuation-in-part of our application Ser. No. 255,088, filed Jan. 30, 1963, and now abandoned.

BACKGROUND OF THE INVENTION

The present invention is concerned with the synthesis of organic chemical compounds and is more particularly directed to a method for the reaction of halogenated organic compounds with unsaturated organic compounds at the site of, and with the at least temporary destruction of, such organic unsaturation.

It has long been known that some halogenated organic chemical compounds can be caused to react with some unsaturated organic compounds. However, methods hitherto available have been severely restricted in scope of usefulness, being applicable essentially to the reaction together of starting materials of a relatively very active nature. Even so, the systems for the carrying out of the reactions have been sufficiently sluggish that, characteristically, long reaction-times have been needed at elevated temperatures in order to bring about a tolerably high degree of conversion and corresponding yield.

SUMMARY OF THE INVENTION

The method of the present invention comprises reacting an ethylenically unsaturated compound of the formula

with a halogenated compound of the formula

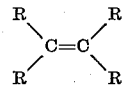

and obtaining a compound of the formula

by a process that comprises contacting together in a mixture said ethylenically unsaturated compound and said halogenated compound in the presence of a catalytic amount of a catalyst of which the essential members are copper and an amine compound, and thereafter maintaining said mixture at a reaction temperature, said amine compound being a member selected from the group consisting of (A) piperidine, (B) substituted piperidine, (C) cyclohexylamine, (D) substituted cyclohexylamine, and (E) compounds of the formula

R'—NH—R'' wherein R' represents a member selected from the group consisting of allyl, benzyl, substituted benzyl, cyclohexyl, substituted cyclohexyl, and lower alkyl; and R'' represents a member selected from the group consisting of R' and (2-cyanoethyl). In the above and succeeding formula, R represents a member selected from the group consisting of hydrogen, hydrocarbyl, a heterocyclic moiety, an organic functional group, and, two given R groups being taken together, a divalent organic radical which completes a cyclic structure; X represents a member selected from the group consisting of hydrogen, hydrocarbyl, halogen, and, both X radicals being taken together, a divalent organic radical which completes a cyclic structure; G represents halogen; and G' represents a member selected from the group consisting of iodine, bromine, and chlorine, said member being of molecular weight equal to, or greater than, the molecular weight of any halogen atom represented by G or X.

The use of the catalyst of the present invention makes possible the carrying out of reactions like those hitherto known but in much shorter time, thus now permitting them to be carried out continuously rather than batchwise. Other benefits accrue from the practice of the present invention, such as higher yields, reduced formation of undesirable side products, and utilization of a lower ratio of halogenated compound to ethylenically unsaturated compound. Typically, the reactions of the present invention are exothermic; when heated they may go forward with such great speed and release of energy that it is desirable to limit the speed of reaction by the portionwise or slow continuous combining together of the reacting substances. Generally, the reactions go forward to completion very quickly, often in a matter of only a few minutes.

Many of the products prepared by the method of the present invention are useful to be added to and blended intimately with flammable polymers to inhibit their flammability and in some cases, to render the polymers self-extinguishing. Certain of them are excellent as denaturants to be dissolved in an alkanol to render it impotable. In addition, numerous of the products can be dehydrohalogenated by procedures like those hitherto known to obtain a further product having an ethylenic unsaturation, which product then, because of the unsaturation, becomes available as a further starting material in the present process.

The course that the present reaction is believed to take is indicated by the following general formulas:

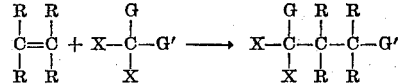

The respective identity of the R and X moieties is not critical, although such identity determines the composition of the products resulting from the method of the present invention. Where R or X is hydrocarbyl, the moiety can be alkyl of from 1 to 18 carbon atoms, such as methyl, isopropyl, tert-butyl, n-hexyl, 1,1,3,3 - tetramethyl - n - butyl, n-decyl, n-tetradecyl, n-octadecyl and the like; alkenyl of from 1 to 18 carbon atoms, such as vinyl, butenyl, nonenyl, 9-octadecenyl; alkynyl of from 1 to 18 carbon atoms, such as propynyl, decynyl, hexadecynyl, and the like; aryl, such as phenyl, naphthyl, phenanthryl, and anthryl; cycloalkyl of from 3 to 6 carbon atoms, such as cyclopentyl and cyclohexyl; cycloalkenyl, such as from 5 to 6 carbon atoms, for example 3 - cyclohexenyl; alkaryl and aralkyl, such as benzyl, naphthylmethyl, p - tert - butylphenyl, phenethyl, 3,5 - xylyl, 2 - chloro - 4 - tert - butylphenyl, and the like. The term "heterocyclic moiety," in the definition of R, is used to designate a radical of a heterocyclic ring being of from 5 to 6, both inclusive, ring atoms, and having from 1 to 2, both inclusive, ring atoms, each of which is independently selected from the group consisting of oxygen, nitrogen, and sulfur. The ring can be aromatic or aliphatic in nature, or intermediate therebetween. Preferred aryl, aralkyl, and alkaryl groups are those having not in excess of 14 carbon atoms.

The terms "substituted benzyl" and "substituted cyclohexyl" are employed in the present specification and claims to designate benzyl and cyclohexyl, respectively, radicals, in which the cyclic moiety thereof bears from 1 to 3 substituents, each of which is independently selected from the group consisting of chlorine, bromine, and lower alkyl.

In the present specification and claims, the term "substituted piperidine" is employed to designate a compound of the formula.

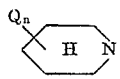

wherein each Q independently represents lower alkyl, and $n$ represents an integer of from 1 to 2, both inclusive. Since the piperidine ring is saturated, one Q can be on the nitrogen atom of the ring.

As employed in the present specification and claims, the term "halogen" designates iodine, bromine, chlorine, and fluorine, only; the term "lower alkyl" designates an alkyl radical being of from 1 to 5, both inclusive, carbon atoms; and the term "amine compound" designates only an amine compound as defined by the above description. The expression "in the presence of" is used to designate the intimate presence together of such substances as are involved, at the molecular or near molecular level. Routinely, this is accomplished by intimately mixing and stirring such substances together with one another.

As employed in the present specification and claims, the term "organic functional group" in the definition of R is employed as those skilled in the art define and use the term. Certain groups, for example, the —OH group, are unavailable because when present on a carbon atom involved in an ethylenic bond—if they can indeed be said to be present—reaction immediately occurs as a result of which the identity of the group is altered. However, allowing for such groups, all other functional groups are permissable. Representative groups are —COOH; —COCl; —CONX$_2$ and —COOX, each X being hydrogen or lower alkyl; —CN; —CHO; —O— lower alkyl; —S— lower alkyl; and halogen.

In the instance where two given R groups are taken together, either when both are on one carbon atom of the ethylenic unit, or when each is on one of the carbon atoms of the ethylenic unit, the two such R groups together constitute a divalent organic radical which completes a cyclic structure. An example of the former instance is 2(10) - pinene, of the latter, cyclohexene. It is thus evident that in addition to simple olefins such as ethylene, 2-butene, 1-octene, and the like, the ethylenically unsaturated compound can be a long-chain compound, which can be prepared by polymerization, or a cycloaliphatic or heterocyclic compound containing an ethylenic group within the ring structure or as a substituent thereon. Similarly, when the two X groups are taken together, they constitute a divalent organic radical which completes a cyclic structure. Representative such cyclic structures include cycloalkane ring structures, i.e. cycloalkylidene radicals, of from 3 to 6 carbon atoms, and heterocyclic ring structures of definition alike to that of the heterocyclic ring in the definition of R. When R or X represents a hydrocarbyl group, a heterocyclic moiety, or, two R groups being taken together, a divalent organic radical which completes a cyclic structure, the resulting group can be substituted. The identity of the substituent is not critical; no substituents have been found which prevent the method of the present invention from going forward. Representative substituents to be employed are hydrocarbyl groups, as hereinabove defined and functional groups such as the following: carboxy; halo-carbonyl; carbamoyl; formyl; cyano; hydrocarbylcarbonyl; hydroxy; mercapto; amino, including mono and dihydrocarbylamino; hydrocarbyloxy; hydrocarbylthio; and halo.

It is sometimes preferred to avoid the use of strongly acidic groups on any of the materials to be employed in the method of the present invention; such groups tend to react preferentially with the amine of the catalyst system. Reactants containing such groups can be used. The amine salt can be deliberately prepared, in situ, sufficient amine being supplied; or the compound can be esterified in the case of —COOH, or reacted to form an amide, as in the case of the —COCl, and products thereby obtained can be conveniently employed in the practice of the present invention.

DESCRIPTION OF THE PREFERRED EMBODIMENTS

In its simplest form, as above set forth, the method of the present invention involves the reaction of a halogenated organic compound and an ethylenically unsaturated compound to produce as 1 to 1 addition product.

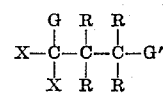

Such a reaction, proceeding no further than a 1 to 1 addition product, can be said to be a first-step reaction. However, the reaction in some instances proceeds further. For example, when an ethylenically unsaturated compound containing two halogen atoms on the same carbon atom and meeting the requirements of the definitions of G and G' is employed as sole starting material, thereby serving both as halogenated organic compound and as ethylenically unsaturated compound, the typical 1 to 1 addition product is initially formed. Since such addition product contains a further reactant site, as required by the present invention, the product can in many instances be reacted with further portions of the original starting material, or with other molecules of 1:1 addition product, to form a new 1 to 1 addition product. This leads to novel adduct substances having long chains. These substances are polymer-like in the sense of being of long chain length; however, they are non-polymer-like in the sense that their repeating unit is the 1:1 adduct unit.

When the method of the present invention is carried out with two reactants, one a halogenated organic compound, and the other an ethylenically unsaturated compound containing two halogen atoms meeting the terms of G and G' and on the same carbon atom, the course of the reaction and the nature of the product or products is dependent on the identity of the various halogen atoms. When the halogen atoms contained by the ethylenically unsaturated compound differ from the halogen atom of highest atomic weight of the halogenated compound, the reaction tends to proceed according to the relative reactivities of the halogen atoms involved and the reactivity varies as atomic weight varies. If the more reactive halogen, that is, the halogen atom of higher atomic weight, is located on the halogenated organic compound, such compound will add to the ethylenically unsaturated compound and form the typically 1 to 1 addition product. If the more reactive halogen is located on the ethylenically unsaturated compound, the reaction tends to be that of the preparation of the polymer-like adducts which have been described above. In this instance, the ethylenically unsaturated compound serves as essentially sole reactant, even though potential other reactant (the halogenated compound) is present. When all halogens are alike and meet the necessary definitions, the product is preponderantly the 1–1 adduct involving both ethylenically unsaturated compound and halogenated compound: only relatively small amounts of polymer-like adduct are formed.

Any of the products which can be prepared by the process of the present invention and which contain one hydrogen atom on one of the carbon atoms of the former ethylenic unsaturation can be subsequently dehydrohalogenated to obtain a compound which again possesses ethylenic unsaturation. Such dehydrohalogenation can also occur when the product contains hydrogen attached to a saturated carbon which is in turn attached to the carbon which bears the G' substituent in the product.

This dehydrohalogenation can be accomplished by known procedures such as refluxing with a base, such as alcoholic potassium hydroxide, or other hydrogen halide acceptor, conveniently an amine, which can be suitable quantities of the amine compound used also as catalyst. With respect to certain of the products, the dehydrohalogenation occurs with great ease and can occur in situ in the primary reaction mixture from the heat of reaction. More commonly, this latter mode of dehydrohalogenation occurs when the initial product is heated to drive off reaction solvents or when the initial product is distilled. As will be seen in the specific examples hereinafter, this type of dehydrohalogenation appears to occur particularly readily when the ethylenically unsaturated starting material has a methyl group adjacent to a phenyl group as in α-methylstyrene. Any of the dehydrohalogenated products formed in any of the above manners can serve as a further ethylenically unsaturated reactant for the process of the present invention.

When more than one ethylenic unsaturation per molecule is present in the unsaturated compound, the possibility exists that a mixture of products will be prepared unless the halogenated organic compound be supplied in amount sufficient to carry to completion reaction at all the unsaturated sites. Certain ethylenically unsaturated compounds, but particularly compounds having more than one ethylenic unsaturation, can be reacted to prepare the 1:1 adduct which then subsequently, in some instances almost immediately, rearranges. Thus, for example, 1,3-butadiene reacts first according to the process of the present invention to yield a 1:1 addition product, which rearranges with shifting of the position of the yet remaining double bond and with shifting of the moieties added from the halogenated compound reactant. In an instance such as this, the remaining double bond, in its new site, becomes available for further reaction in accordance with the method of the present invention.

In carrying out the process of the present invention, the ethylenically unsaturated compound reactant and the halogenated compound reactant are contacted in the presence of at least a catalytic amount of the copper-amine compound catalyst system. The temperature at which the reaction is carried out is not critical. Generally, a reaction temperature range from 0° to 200° C. is employed, although temperatures outside of this range can be employed. Most preferably, a temperature range of from 25° to 100° C. is employed.

Conveniently the reaction is carried out by contacting together the reactants and catalyst system in the presence of a liquid reaction medium, thus forming a reaction mixture. However, neither the use of a liquid reaction medium nor the identity of such medium, if used, is critical to the practice of the present invention. If used, the medium can be any of the organic liquids typically employed as solvents in organic synthesis, including the simple hydrocarbons, such as pentane, benzene, toluene, and cyclohexane; ethers, such as tetrahydrofuran and diethyl ether; ketones, such as acetone; alcohols, such as tert-butanol and methanol; nitriles, such as acetonitrile; and halogenated hydrocarbons, such as methylene chloride and chlorobenzene. However, it is sometimes preferred to avoid the use of a halogenated, typically chlorinated, organic liquid as solvent, unless the same substance is to serve as halogenated compound reactant, or unless all halogen atoms of both solvent and reactant are the same. The method of the present invention does not go forward with its typical speed and high yield of product when water is employed as reaction medium. However, the presence of a minor amount of water such as may be contributed by the use of the hydrate form of a given copper-containing compound, or by the use of materials which are "wet," does not affect the course of the reaction. Accordingly, the reaction of the present invention is preferably carried out in an essentially—but not exclusively—non-aqueous medium.

The reacting can be carried out at atmospheric pressure, at superatmospheric pressure, of, for example, 1 to 20 or more atmospheres, or at subatmospheric pressure, of from, for example, 650 or less to 0.1 millimeter. Boiling temperatures of reaction mixture components tend to limit these values. Some of the desired adduct is obtained immediately upon the contacting of the reactants; however, higher yields result when the reaction mixture containing the reactants is permitted to stand at a temperature in the reaction temperature range for a period of time, such as from 1 minute to 4 or more hours. In the instance of reaction between an ethylenically unsaturated compound and a halogenated compound, one of which compounds tends to be reactive, with difficulty, longer reaction time, such as up to 24 hours or more, may be preferred. Most typically, reaction times of from about one to about 15 minutes suffice.

The amounts of the reactants to be employed are not critical, some of the desired adduct being formed when employing any amount. However, when it is desired to obtain higher yields within shorter reaction time and to employ reactants in the amounts most efficient for complete conversion, it is preferred to employ one molecular proportion of the ethylenically unsaturated compound and from 0.5 to 4.0 molecular proportions of the halogenated compound. In some instances, it may be preferred to employ one molecular proportion of the ethylenically unsaturated compound and up to 20 or more molecular proportions of the halogenated compound. Customarily, however, the benefits of the practice of the present invention are obtained when employing reactants in a lower ratio, such as from 1.0 to 3 molecular proportions of halogenated compound per molecular proportion of ethylenically unsaturated compound.

It is critical to the practice of the present invention to employ, in a catalytic amount, the catalyst system comprising the amine compound and copper.

The catalyst system can be prepared in advance and then added to the reaction. Alternatively, the amine compound and copper can be added separately to the reaction mixture to prepare the catalyst in situ. The identity of the particular component which constitutes the source of the copper in the system is not critical. The copper, though an essential part of the catalyst system, can be derived from any of a great many copper-containing substances; suitable copper compounds include, for example, metallic copper, copper acetate, basic copper acetate, copper benzoate, copper metaborate, cuprous bromide, cupric bromide, cupric butyrate, cuprous carbonate, cupric carbonate, basic cuprous carbonate, cupric chloride, cuprous chloride, cuprous cyanide, cupric ethylaceto-acetate, cupric fluoride, cupric formate, cuprous formate, cuprous hydroxide, cupric hydroxide, cuprous iodide, cupric acetate, cupric laurate, cuprous nitrate, cupric oleate, cupric oxalate, cuprous suboxide, cuprous oxide, cupric palmitate, cupric orthophosphate, cupric stearate, cuprous sulfate, cupric sulfate, cupric tartrate, diamminecopper acetate, tetramminecopper sulfate, copper xanthate, cupric dichromate, cupric nitrate, basic cupric nitrate, cupric oxychloride, cupric ferricyanide, cuprous ferricyanide, cupric ferrocyanide, cuprous fluosilicate, cupric thiocyanate, cupric tungstate, and the like. In addition, copper-containing compounds which are hydrates can be employed, as, for example, cupric chloride dihydrate, cupric sulfate pentahydrate, and the like, and the use of such a hydrated salt has no observable detrimental effect upon the process of the present invention. Mixtures of different copper-containing compounds can be employed.

While the identity of the source of the copper is not critical, certain copper-containing substances have been found to be superior in the practice of the present invention. These substances are the copper halides, especially those wherein the halogen atom(s) are the same as the G moiety, or as all halogen moieties, of the halogenated compound reactant.

The amine compound can be employed as a free amine, or as a derivative thereof, typically an acid salt of the amine compound. Generally, the use of the amine compound as a free amine is preferred. The amine compound is, as set forth above, always a member selected from the group consisting of (A) piperidine, (B) substituted piperidine, (C) cyclohexylamine, (D) substituted cyclohexylamine, and (E) compounds of the formula

R'—NH—R"

wherein R' represents a member selected from the group consisting of allyl, benzyl, substituted benzyl, cyclohexyl, substituted cyclohexyl, and loweralkyl; and R" represents a member selected from the group consisting of R' and 2-cyanoethyl. Representative amine compounds to be used in carrying out the method of the present invention are piperidine, cyclohexylamine, diallylamine, dibenzylamine, dicyclohexylamine, diisopropylamine, N-isopropylbenzylamine, N-isopropylcyclohexylamine, N-allylbenzylamine, N-allylmethylamine, N-allylcyclohexylamine, N-benzylcyclohexylamine, N-methylbenzylamine, N-methylcyclohexylamine, N-methylisopropylamine, N-ethylbenzylamine, N-ethylcyclohexylamine, N-ethylisopropylamine, N-(2-cyanoethyl)benzylamine, N-(2-cyanoethyl)cyclohexylamine, N-(2-cyanoethyl)isopropylamine, diisobutylamine, diethylamine, di-n-propylamine, dimethylamine, di-sec-butylamine, di-n-butylamine, N-n-propylbenzylamine, N-n-propylcyclohexylamine, N-isobutylbenzylamine, N-sec-butylbenzylamine, N-n-butylcyclohexylamine, N-(2-cyanoethyl)ethylamine, 1-methylcyclohexylamine, 2-chlorocyclohexylamine, 3,3,5-trimethylcyclohexylamine, 2,4-diethylcyclohexylamine, 2,2',4,4'-tetramethyldicyclohexylamine, 2,4 - dichlorodibenzylamine, 2-chloro-N-ethylcyclohexylamine, p - chloro-N-isopropylbenzylamine, N-cyclohexyl - o - chloro-benzylamine, and p-bromobenzyl-N-methylamine.

The amount of each component of the catalyst system to be employed according to the present invention is critical only in that the components must be present in such amounts as in combination to exert a catalytic effect on the reaction. The actual weight of the components is not critical inasmuch as reactions are catalyzed and caused to go forward in the presence of small traces of the catalyst system. In general, a catalytic effect is observed when employing 0.00001 molecular equivalent of amine and 0.0001 atomic equivalent of copper, as elemental copper or as copper-containing compound, for 1 molecular equivalent of halogenated compound. Still larger amounts of amine, such as an amount equimolecular with either principal reactant, or more, can be used. Also, the copper-containing compound can be present in larger amounts, such as amounts stoichiometrically equivalent, on copper basis, with the employed amine, or more. The preferred ratio of the components of the catalyst system to the halogenated compound is about 0.01–0.2 molecular equivalent of amine and about 0.001–0.01 molecular equivalent of copper-containing compound per 1 molecular equivalent of halogenated compound.

Typically, the amine compound employed in the practice of the present invention brings about the efficacious homogeneity of the reaction mixture responsible for the advantages of the present invention. This pertains whether or not a solvent is employed as diluent.

Upon the completion of the contacting of the reactants in the presence of the catalyst system, with the formation of a quantity of product, the reaction mixture can thereupon be employed without further treatment for the useful purposes of the product prepared therein.

Furthermore, upon the completion of the contacting of the reactants and catalyst with the formation of a quantity of product, the desired product can be separated from the reaction mixture, and, if desired, purified. The procedures by which such separation and purification are accomplished are like those known by chemists skilled in the art, and include, in the case of separation, such techniques as distillation, solvent extraction, filtration, and the like, and in the case of purification, such techniques as recrystallization. Where the product is capable of undergoing dehydrohalogenation, the product, either in the reaction mixture wherein prepared or following separation from the reaction mixture, can be treated as discussed foregoing to cause the dehydrohalogenation to take place.

The following examples illustrate the present invention but are not limiting as to the scope thereof. This is particularly notable in respect to the present invention, because of the very large number of combinations of ethylenically unsaturated compounds and halogenated organic compounds of which reaction according to the present invention has been attempted, all have been conducted successfully. This has been true even when attempting to prepare highly complex products of hitherto unknown structures and very high molecular weights, using starting reactants especially selected to challenge the limits of operability. Hence, the following examples are illustrative only.

Example 1.—α-(2,2,2-trichloroethyl)styrene

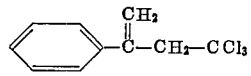

The compound of the present example was believed to have been earlier synthesized by Kharasch and his coworkers. See The Journal of Organic Chemistry 18, 328 (1953). Using the best method known at the time, they reported that they reacted bromotrichloromethane and α-methylstyrene and thereafter dehydrobrominated whatever adduct was first obtained. Completion of only their first addition occupied 7 hours, the dehydrobromination coming after the end of the 7 hour period.

In the present example the indicated compound is synthesized in good yield and industrially satisfactory purity, according to the method of the present invention, in reaction times as short as 0.5 minute.

In the practice of the present invention, α-methylstyrene (118.2 grams; 1.0 mole), bromotrichloromethane (396.4 grams; 2.0 moles), and about 0.5 gram of cuprous chloride (0.005 mole) are successively placed in a vessel which is provided with external heat-exchange means, reflux condenser, and an entry port for addition of further material. The mixture in the vessel is heated to a temperature of about 40° C., whereupon two drops of piperidine are added in rapid succession to said mixture, thus forming a complete reaction mixture. The amount of piperidine employed is equivalent to about 0.01 gram, or 0.00003 mole per mole of bromotrichloromethane.

During about the first 10 seconds following the addition of the piperidine, the temperature of the reaction mixture rises sharply, reaching a temperature of about 120° C. by about 0.5 minute after the piperidine addition. Heat of reaction refluxes excess bromotrichloromethane. A representative sample is separated from the reaction mixture and analyzed. In one reaction conducted according to the present example, the analyzed sample was found to contain the dehydrohalogenation product, α-(2,2,2-trichloroethyl)styrene, in a yield of about 80 percent, based on essentially complete conversion of α-methylstyrene. In all runs, the sample is found to contain the said product in yield of about the same order as the above.

Thereafter, steam is sparged through the reaction product mixture to vaporize and remove excess bromotrichloromethane and to obtain the crude α-(2,2,2-trichloroethyl)styrene product as an oily product residue. The oily product residue can be employed directly, or purified. In one purification, product is washed with water to remove copper salts and piperidine in the form of piperidine hydrochloride. The washed product oil is distilled in vacuo, the product separating by distillation from unreacted starting material and side products at a temperature of 83° C. and pressure of 1.0 mm. The product is found to be a liquid at room temperature and colorless when pure, having a refractive index $n$ measured at 25° C. for the D line of sodium light of 1.5608. Kharasch and coworkers found their redistilled product to be a "colorless oil" boiling at 67° C. under 0.1 millimeter pressure.

Example 2

In procedures essentially the same as the foregoing, using like amounts of substance, bromotrichloromethane is reacted with α-methylstyrene, with cuprous acetate and dibenzylamine as catalyst. Reaction occurs very rapidly to yield the compound prepared in Example 1.

Example 3.—α-(2,2,2-trichloroethyl)styrene

The α-(2,2,2-trichloroethyl)styrene product can also be prepared according to the practice of the present invention and in procedures generally similar to those employed in Example 1, except that carbon tetrachloride, in an amount of 231.7 grams (1.5 mole) is utilized as halogenated organic compound. The reaction mixture is at first heated to a temperature of about 80° C., whereupon isopropylcyclohexylamine, as the amine portion of the catalyst, is introduced as last essential component. Upon introduction of the isopropylcyclohexylamine, heat from the resulting reaction refluxes the carbon tetrachloride and the reaction goes to completion in about twenty minutes.

Thereafter, steam is sparged through the reaction mixture to vaporize and remove excess carbon tetrachloride and to obtain the α-(2,2,2-trichloroethyl)styrene product as an oily product residue.

The oily residue is washed with water to remove copper salts and isopropylcyclohexylamine in the form of its hydrochloride salt. The washed product oil is distilled in vacuo, the product separating by distillation from unreacted starting material and side products at a temperature of 83° C., and pressure of 1.0 mm. The product is analyzed and identified as the α-(2,2,2-trichloroethyl) styrene product.

Example 4

In manner similar to Example 3, using 1 mole of ethylenically unsaturated compound and 2 moles of halogenated organic compound, allyl cyanide is reacted with bromotrichloromethane, with cupric cyanide and dicyclohexylamine as catalyst. Reaction occurs promptly to yield 3-bromo-5,5,5-trichlorovaleronitrile. The compound boils at 77–78° C. under 0.03 millimeter mercury pressure. The reaction goes forward to an industrially satisfactory yield in 1 hour.

Example 5.—2-bromo-3-(trichloromethyl)norbornane

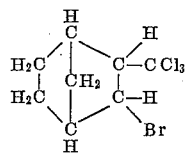

2-norbornene (292.5 grams; 1.0 mole), bromotrichloromethane (396.4 grams; 2.0 moles), and 0.25 gram of cupric sulfate pentahydrate, representing about 0.001 gram atom equivalent of copper, are placed in a vessel which is provided with heating means, stirring means and an entry port for addition of further material. The resulting mixture is at a temperature of about 75° C.; to it are added in rapid succession a few drops of piperidine. The amount of piperidine employed is equivalent to about 1.0 gram (0.012 mole per mole of bromotrichloromethane). After the piperidine addition has been made, the complete reaction mixture is stirred and the heating continued for 20 minutes to produce the 2-bromo-3-(trichloromethyl) norborane product as a liquid material boiling at a temperature of 70–75° C. at 0.1 mm.

Example 6.—Preparation of 1-chloro-2-(trichloromethyl)cyclohexane

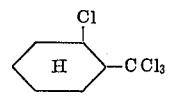

A mixture of 82.2 grams (1.0 mole) cyclohexene, 200.0 grams (1.3 mole) carbon tetrachloride, and 63.5 grams (1.0 mole) metallic copper is stirred and brought to a temperature of about 50° C. To the resulting mixture is added portionwise over a period of time 101.2 grams (1.0 mole) of diisopropylamine. Upon the completion of the addition of the diisopropylamine, the reaction appears to go to completion in less than 1 hour. The reaction mixture is washed and distilled to separate the 1-chloro-2-(trichloromethyl)cyclohexane product. The product is a liquid having a refractive index $n_D^{25.7°\ C.}$ of 1.5190.

Example 7

Essentially the foregoing example is repeated but that the employed amine is isopropylbenzylamine. The same product compound is formed; the reaction goes to practical completion in a half hour.

Example 8.—Addition of carbon tetrachloride to limonene

A mixture is prepared consisting of 272.4 grams (2.0 moles) limonene, 307.7 grams (2.0 moles) carbon tetrachloride, and 5.0 grams (0.08 gram atom) metallic copper, as a powder. The resulting mixture is heated to a temperature of about 35° C., and subsequently 63.6 grams (0.5 mole) N-ethylcyclohexylamine are added portionwise thereto over a period of 3.5 hours. Toward the end of the addition of the amine, additional copper in an amount of 0.5 gram (0.008 gram atom) is added to the reaction mixture, for a total of 5.5 grams.

Following the addition of the amine, the reaction mixture is maintained at a temperature of 50° C. for a period of 1.0 hour and then washed with water and the separated liquor distilled to obtain 1-methyl-4-(3,3,3-trichloro-1-methyl-propenyl)-cyclohexene as the dehydrohalogenated product from the initial addition-product.

Example 9

Example 8 is repeated but the employed amine is diethylamine. Catalytic amine and copper are added as single initial portions. Reaction is essentially complete after one hour reaction time.

Example 10.—Addition of carbon tetrachloride to divinylbenzene

A mixture is prepared consisting of 144.4 grams (1.1 mole) of divinylbenzene, 154.5 grams (1.0 mole) of carbon tetrachloride, 3.2 grams (0.05 mole) of copper as the metal powder, and a small amount of tertiary-butyl catechol, as inhibitor for the potential polymerization of the divinylbenzene. To the resulting reaction mixture at a temperature of 50° C. is added portionwise and with stirring over a period of one hour 101.2 grams (1.0 mole) of diisopropylamine. Thereafter the reaction mixture is suction filtered, and the filtrate distilled to obtain the desired 1 to 1 addition product, of the formula

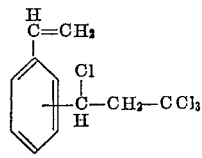

Example 11

In procedures generally similar to the foregoing except that the employed catalyst is composed of N-ethylcyclohexylamine and cuprous chloride and the carbon tetrachloride is employed in an amount twice equimolecular with the divinylbenzene, there is obtained a bis(1,3,3,3-tetrachloropropyl)benzene product.

Example 12

In procedures generally similar to the foregoing Example 10 except that the tertiarybutyl catechol is omitted, employing 78.1 grams (0.5 mole) of m-diisopropenylbenzene, and 77.0 grams (0.5 mole) of carbon tetrachloride, together with a catalytic amount of copper powder and piperidine, there is prepared a 1:1 addition product which dehydrohalogenates to form 1-isopropenyl-3-(3,3,3-trichloro-1-methylenepropyl)benzene in good yield.

Example 13

In procedures generally similar to that of Example 12 except that the employed amine is N-methylbenzylamine and the carbon tetrachloride is employed in amount twice equimolecular with the m-diisopropenylbenzene, there is obtained a 1,3 - bis(3,3,3-trichloro-1-methylenepropyl) benzene product.

Example 14.—(1,3,3,3-tetrachloropropyl)benzene

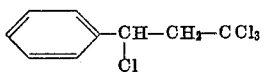

A mixture is prepared consisting of 104.2 grams (1.0 mole) styrene inhibited from polymerization with 10 parts tertiary-butyl catechol per million parts styrene, 154.5 grams (1.0 mole) carbon tetrachloride, and a small catalytic amount of copper powder. The resulting mixture is heated to a temperature of 50° C. and 101.2 grams (1.0 mole) diisopropylamine thereafter added portionwise over a period of time and with stirring to the said mixture, creating a complete reaction mixture. During the addition of diisopropylamine, the temperature of the reaction mixture rises for a period of time from heat of reaction. The reaction appears to be complete within about an hour. A solid diisopropylamine hydrochloride salt forms in the reaction mixture from the time of the beginning of the addition of diisopropylamine.

Thereafter the reaction mixture is filtered and the filtrate distilled to obtain the (1,3,3,3-tetrachloropropyl) benzene product as a liquid having refractive index $n$ measured at 25° C. for the D line of sodium light of 1.5532. The product is analyzed and found to contain the said product in high purity, with a small amount of the dehydrohalogenated product (3,3,3-trichloropropenyl)benzene.

Example 15

Dicyclohexylamine (45.3 grams; 0.25 mole) is added portionwise over a period of 10 hours and with stirring to a mixture of 154.0 grams (1.0 mole) carbon tetrachloride, 68.0 grams (1.05 mole) isoprene, and a small catalytic amount of copper powder. At the beginning of the addition the mixture is at room temperature of about 25° C. During the dicyclohexylamine addition the mixture is heated to 50° C. and maintained thereat for the remainder of the period of the addition and for a subsequent period of 4 hours. After the 4 hour period, the mixture is filtered, and the filtrate distilled to separate 3,5,5,5-tetrachloro-3-methyl-1-pentene product, which is thereafter analyzed and identified.

Examples 16–44

In order to illustrate variations available with the method of the present invention, a representative ethylenically unsaturated compound (styrene) was reacted with a representative halogenated compound (CCl$_4$) in accordance with numerous embodiments of the present invention. In all of Examples 16–44, the reaction was carried out by adding sequentially to a copper-containing compound, 0.5 mole of styrene, 1.0 mole of CCl$_4$, an amine compound, and, when employed, a solvent. The reaction period of these examples was the period under reflux.

At the end of the reaction period, the reaction mixture was washed with 1:4 hydrochloric acid and the organic solution remaining after washing was distilled to separate the 1,3,3,3-tetrachloropropylbenzene product.

In all reactions reported in Examples 16–44, conversion of the styrene was essentially complete.

In particular, in Examples 16 to 23, inclusive, the copper-containing compound was cuprous chloride, employed in the amount of 0.522 gram (0.00527 mole), the amine compound was piperidine, and solvent was employed in the amount of 100 milliliters. In each of these Examples 16 to 23, a solvent was employed. Results were as follows:

| Example Number | Amount of Piperidine, grams | Identity of Solvent | Yield of Product, percent | Reaction Period, minutes |
|---|---|---|---|---|
| 16 | 4.8 | Tertiary butanol | 86 | 15 |
| 17 | 4.8 | Benzene | 75 | 15 |
| 18 | 4.8 | Hexane | 76 | 15 |
| 19 | 4.2 | Cyclohexane | 83 | 20 |
| 20 | 4.2 | Acetonitrile | 71 | *3 |
| 21 | 4.2 | Chlorobenzene | 87 | 15 |
| 22 | 4.2 | Tetrahydrofuran | 94 | 15 |
| 23 | 4.2 | Toluene | 78 | 4 |

*Hours.

In Examples 24–36, the identity of the amine compound was varied. In these examples, all other reaction conditions were kept essentially uniform, cuprous chloride was employed as copper-containing compound and solvent was omitted.

| Ex. No. | Identity of Amine | Amount of Amine, Grams | Amount of CuCl, Gram | Yield of Product, Percent | Reaction Period, Minutes |
|---|---|---|---|---|---|
| 24 | Piperidine | 8.6 | 0.348 | 84 | 6 |
| 25 | Dicyclohexylamine | 27.54 | 0.348 | 77 | 20 |
| 26 | Dibenzylamine | 19.31 | 0.348 | 87 | 30 |
| 27 | Piperidine | 8.3 | 0.522 | 83 | 4 |
| 28 | Isopropylbenzylamine | 7.3 | 0.522 | 82 | 20 |
| 29 | Diisopropylamine | 5.1 | 0.522 | 94 | 20 |
| 30 | N-ethylcyclohexylamine | 6.2 | 0.522 | 88 | 12 |
| 31 | Isopropylcyclohexylamine | 6.8 | 0.522 | 86 | 18 |
| 32 | N-methylbenzylamine | 5.9 | 0.522 | 90 | 20 |
| 33 | Diisobutylamine | 6.4 | 0.522 | 91 | 20 |
| 34 | Cyclohexylamine | 4.9 | 0.522 | 88 | 20 |
| 35 | Diethylamine | 3.6 | 0.522 | 84 | 20 |
| 36 | Di-n-propylamine | 5.0 | 0.522 | 90 | 20 |
| 37 | N(2-cyanoethyl)cyclohexylamine | 7.4 | 0.522 | 88 | 20 |

In Examples 38–44, the identity of the copper-containing compound was varied; however, in each reaction piperidine was employed as the amine compound and no solvent was employed in any of the reactions.

| Ex. No. | Identity of Copper Compound | Amount of Copper Compound, Grams | Amount of Piperidine, Grams | Yield of Product, Percent | Reaction Period, Minutes |
|---|---|---|---|---|---|
| 38 | CuCl | 0.522 | 8.3 | 83 | 4 |
| 39 | Cu(C₂H₃O₂)₂·H₂O | 1.05 | 8.3 | 61 | 20 |
| 40 | Cu(CN)₂ | 0.323 | 8.3 | 60 | 25 |
| 41 | CuCl₂ | 0.709 | 4.8 | 85 | 4 |
| 42 | CuCl₂·2H₂O | 0.899 | 4.8 | 84 | 4 |
| 43 | Cu(NO₃)₂·3H₂O | 1.27 | 4.8 | 67 | 15 |
| 44 | CuSO₄ | 0.843 | 4.8 | 62 | 25 |

Examples 45–47

In the Examples 45–47, the reaction procedures of Examples 16–44 were employed except that in place of styrene as ethylenically unsaturated compound, 1-octene was used, in the amount of 112 grams (1.0 mole). In all reactions reported in Examples 45–47, piperidine was employed as the amine compound in the amount of 17 grams. The results were as follows:

| Example Number | Identity of Copper Compound | Amount of Copper Compound, gram | Identity of Solvent | Amount of Solvent, grams | Yield of Product, (percent) | Reaction Period minutes |
|---|---|---|---|---|---|---|
| 45 | CuCl | 0.116 | Tert-butanol | 120 | 80 | 3 |
| 46 | CuCl | 0.348 | None | | 60 | <3 |
| 47 | CuCl₂·2H₂O | 0.600 | do | | 73 | <3 |

Example 48

In procedures essentially the same as those of the preceding examples, two moles of divinyl ether are reacted with four moles of CCl₄ in the presence of a catalyst system consisting of 2-chlorocyclohexylamine and metallic copper. The product, bis(1,3,3,3-tetrachloropropyl)ether, is obtained in high yield in a reaction time of about 30 minutes.

Example 49

In procedures essentially the same as those of the preceding examples, 1-hexadecene is reacted with CCl₄ in the presence of a catalyst system consisting of N-cyclohexylbenzylamine and cuprous chloride. The product, 1,1,1,3-tetrachloroheptadecane, is obtained in high yield in a reaction time of less than 15 minutes.

Example 50

In procedures essentially the same as those of the preceding examples, 1,3-cyclohexadiene is reacted with bromotrichloromethane in the presence of a catalyst system consisting of dimethylamine and cupric bromide. The product is predominantly 3 - bromo - 6 - trichloromethyl-1-cyclohexane, the result of rearrangement of the simple 1:1 adduct, plus a minor amount of 4-bromo-3-trichloromethyl-1-cyclohexene.

Example 51

In procedures essentially the same as those of the preceding examples, chlorotrifluoroethylene is reacted with bromotrichloromethane in the presence of a catalyst system consisting of diallylamine and cupric bromide hydrate. The product, 1-bromo-1,3,3,3-tetrachloro-1,2,2-trifluoropropane, is obtained in high yield in a reaction time of less than five minutes.

Example 52

In procedures essentially the same as those of the preceding examples, dimethyl maleate is reacted with bromotrichloromethane in the presence of a catalyst system consisting of piperidine and cuprous bromide. The product, dimethyl 2-bromo-3-trichloromethylsuccinate, is obtained in high yield in a reaction time of about ten minutes.

Example 53

In procedures essentially the same as those of the preceding examples, 3 - chloro - 3,3 - difluoro-2 - (trifluoromethyl)-1-propene is reacted with iodotrifluoromethane in the presence of a catalyst system consisting of dicyclohexylamine and cupric iodide. The product 4-chloro-1,1,1,4,4-pentafluoro-3-iodo-3-(trifluoromethyl)butane is obtained in high yield in a reaction time of less than thirty minutes.

Example 54

In procedures essentially the same as those of the preceding examples, ethylene is reacted with chloroiodomethane in the presence of a catalyst system consisting of diisobutylamine and cupric chloride. The product, 1-iodo-3-chloropropane, is obtained in high yield in a reaction time of about fifteen minutes.

Example 55

In procedures essentially the same as those of the preceding examples, vinyl acetate, inhibited from polymerization by hydroquinone, is reacted with CCl₄ in the presence of a catalyst system of piperidine and cuprous chloride. The product, 1,3,3,3-tetrachloropropyl acetate, is obtained in high yield in a reaction time of less than fifteen minutes.

Example 56

In procedures essentially the same as those of the preceding examples, indene is reacted with bromotrichloromethane in the presence of a catalyst system consisting of p-bromobenzylamine and cuprous bromide. The product, 2-bromo-1-(trichloromethyl)indane is obtained in high yield in a reaction time of about thirty minutes.

It is pointed out that those skilled in the art prior to the present invention, when desiring 1:1 adducts of the sort prepared according to the present invention, have had to employ large excesses of the halogenated compound to prevent excessive chain propagation with resulting production of tarry polymers. In some way not fully understood, the synthesis of the present invention results in predominantly 1:1 addition pronucts when employing equimolecular amounts of reactants, or either reactant in moderate, such as 1:1.5, excess.

We claim:

1. The method which comprises reacting the ethylenically unsaturated compound, α-methylstyrene, with a halogenated compound selected from bromotrichloromethane and carbon tetrachloride by a process which comprises contacting together in a mixture said α-methylstyrene and said halogenated compound in the presence of a catalytic amount of a catalyst of which the essential members are copper and an amine compound, maintaining said mixture at a reaction temperature and thereafter separating from the reaction mixture the dehydrohalogenated product, α-(2,2,2-trichloroethyl)-styrene; said amine compound being a member selected from the group consisting of (A) piperidine, (B) substituted piperidine of the formula

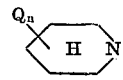

wherein each Q independently represents lower alkyl, and n represents an integer of from 1 to 2, both inclusive, (C) cyclohexylamine, (D) substituted cyclohexylamine wherein "substituted cyclohexyl" refers to a cyclohexyl radical which bears from 1 to 3 substituents, each of which is independently chlorine, bromine, or lower alkyl, and (E) compound of the formula

wherein R' represents a member selected from the group consisting of allyl, benzyl, substituted benzyl in which the cyclic moiety thereof bears from 1 to 3 substituents, each of which is independently chlorine, bromine, or lower alkyl, cyclohexyl, substituted cyclohexyl as defined hereinabove, and lower alkyl; and R" represents a member selected from the group consisting of R' and 2-cyanoethyl.

2. Method of claim 1 wherein the amine compound is piperidine.

3. Method of claim 1 wherein the amine compound is dicyclohexylamine.

4. Method of claim 1 wherein the amine compound is dibenzylamine.

5. Method of claim 1 wherein the amine compound is diethylamine.

6. Method of claim 1 wherein the halogenated compound is carbon tetrachloride.

7. Method of claim 6 wherein the amine compound is piperidine.

References Cited

UNITED STATES PATENTS

| | | |
|---|---|---|
| 2,906,781 | 9/1959 | Montgomery. |
| 3,213,149 | 10/1965 | Takahashi et al. |

FOREIGN PATENTS

| | | |
|---|---|---|
| 715,614 | 8/1965 | Canada. |
| 13,845 | 5/1960 | Israel. |

OTHER REFERENCES

Asscher et al., J. Chem. Soc., pp. 2261–2264 (1961).

BERNARD HELFIN, *Primary Examiner.*

H. T. MARS, *Assistant Examiner.*

U.S. Cl. X.R.

260—49, 465.7, 468, 469, 476, 485, 514, 515, 544, 558, 561, 598, 599, 600, 601, 602, 609, 611, 614, 648, 658.